United States Patent Office 3,674,404
Patented July 4, 1972

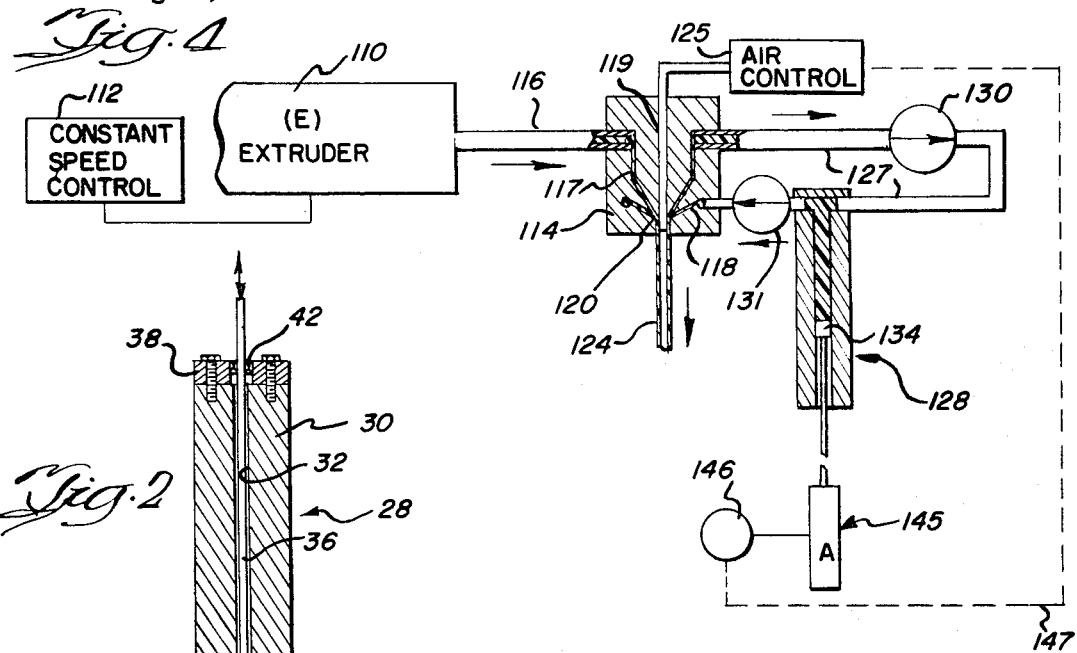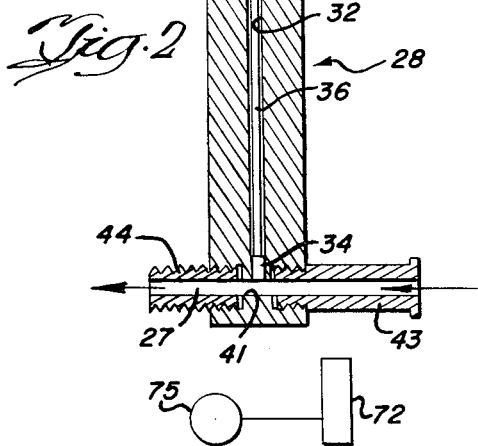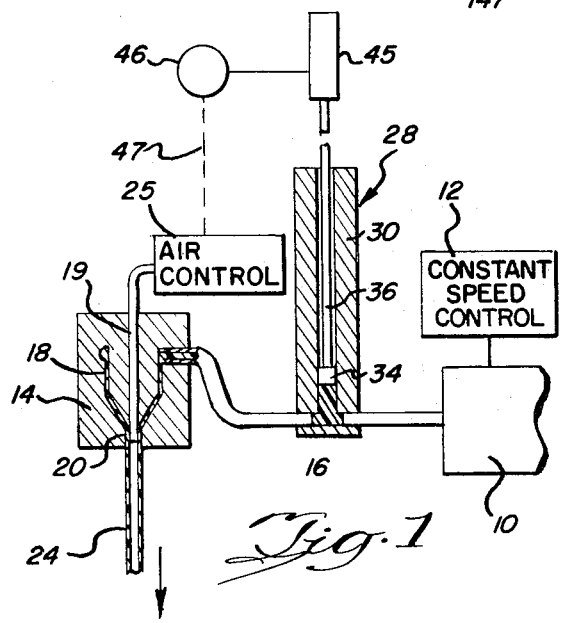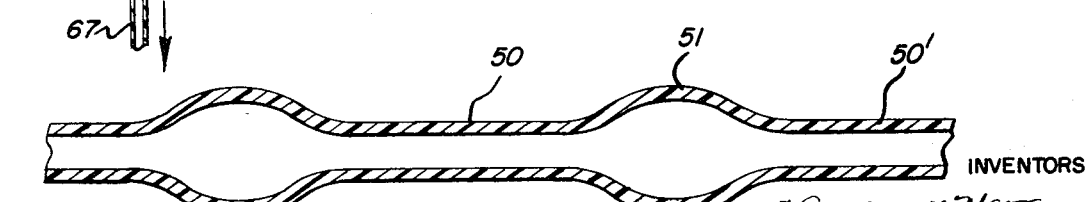

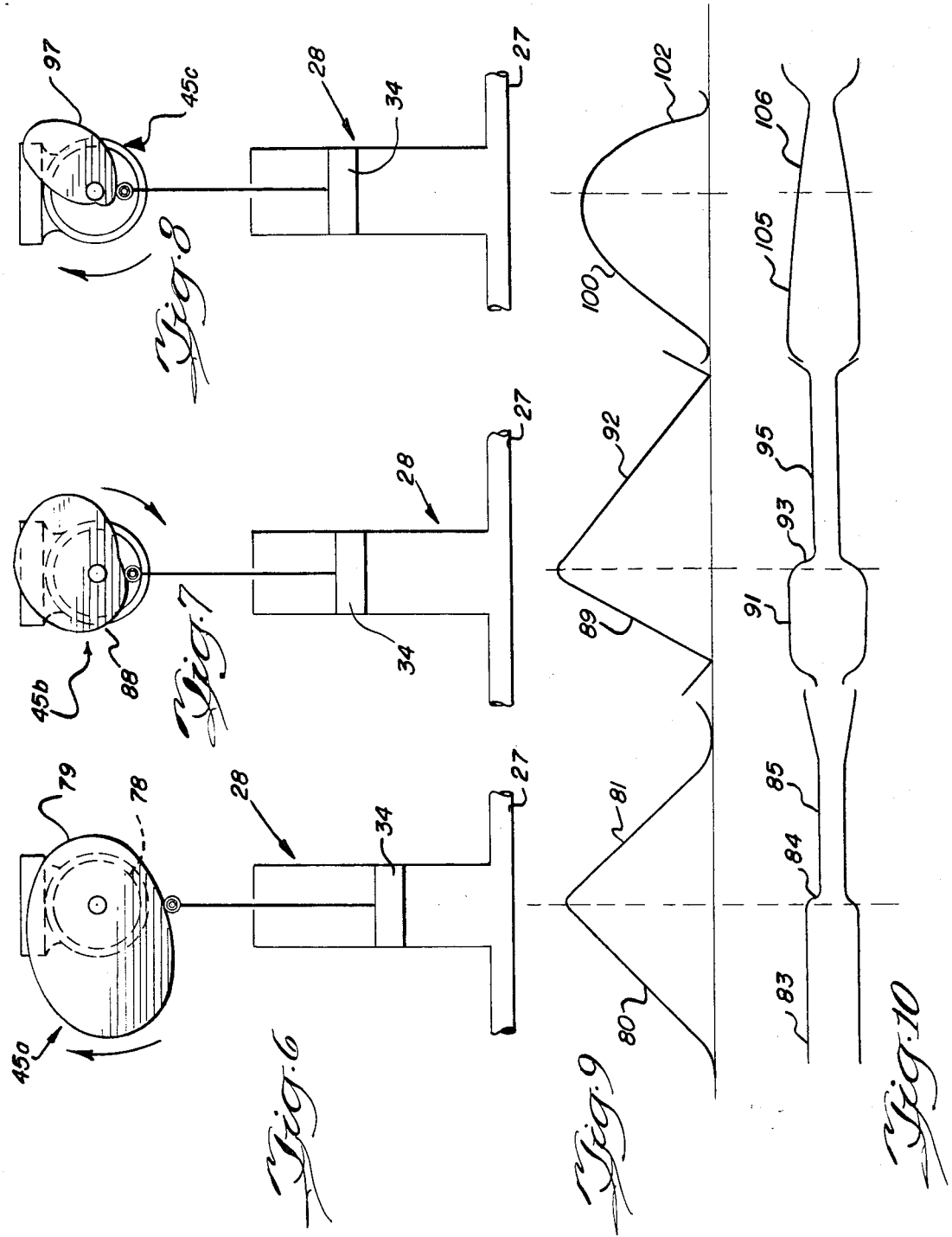

3,674,404
EXTRUDER APPARATUS AND ACCUMULATOR
Norbert W. Burlis and Daniel A. Talonn, University City, Mo., assignors to Sherwood Medical Industries Inc.
Filed Aug. 6, 1970, Ser. No. 61,715
Int. Cl. B29d 23/04
U.S. Cl. 425—326
6 Claims

ABSTRACT OF THE DISCLOSURE

A die and extruder apparatus for producing a wide variety of contoured extrudate such as rod or tubing sections through the provision of a piston and cylinder device interconnected in the molten plastic passage between the extruder and the die with the piston of the piston and cylinder device being driven in a withdrawal stroke to reduce the flow of extrudate from the extrusion die in a programmed manner and being driven in an inject stroke to increase the flow of extrudate through the extrusion die in a programmed manner, to vary the contour of the extrudate at predetermined intervals.

BACKGROUND OF THE PRESENT INVENTION

Various types of extruding apparatus have been provided in the past for producing tubing or rods having variations in external diameter, internal diameter, wall thickness, etc. Such extruding apparatus is designed to provide periodic and repetitive variations in the characteristics of the tubing along the length of the extrudate so that the tubing may be thereafter cut at predetermined intervals into usable tubing or rod products, such as for the biomedical field. Examples of such products are various types of catheters, Yankauer suckers, drainage and aspirating tubes as well as tubing having tapered end portions for interconnecting various biomedical devices. This is merely an exemplary list and other similar products are made by the same general type of extruding apparatus. For example, see U.S. 2,940,126 for tubing having a tapered section and U.S. Re. 25,788 for tubing having integral connectors formed at its ends.

One exemplary apparatus for producing tubing or rods having variations in diameter along its length includes a single extruder and die combination with a control for varying the speed of the extruder itself, thus varying the flow from the extruder to the die in a programmed fashion. The disadvantage in this construction is that an extruder is not designed to operate well in varying speed ranges. A second disadvantage in this prior extruder construction is that since the extruder is frequently operating at less than its rated speed, the total output of extrudate is reduced.

Still another prior extruder apparatus for producing tubing or rods having variations in contour along its length includes two extruders feeding molten plastic to a single or composite extruding die. This arrangement has a high initial cost and significant maintenance costs.

It is a primary object of the present invention to provide an extruder apparatus that extrudes tubing or rods of varying contour, ameliorating or eliminating the problems noted above with prior extruder apparatus.

SUMMARY OF THE PRESENT INVENTION

In accordance with the present invention, an extruding apparatus is provided that is capable of producing wide variations in contour and wall thickness of the tubing along its length with a single extruder running at constant speed. With the extruder continuously running at a constant speed the total extrudate output is significantly increased over prior extruder apparatuses for the same purpose and maintenance costs are also decreased because of the simplified construction.

To achieve variations in extrudate flow from the extruding die with a constant flow of molten plastic from the extruder toward the die, an injector-accumulator is provided for periodically withdrawing and injecting molten plastic flowing between the extruder and the die. The injector-accumulator may consist of a reciprocating piston and cylinder device with a suitable driver and controls for moving the piston through a withdrawal phase and an inject phase.

During the withdrawal phase, the injector-accumulator withdraws molten plastic flowing from the extruder to the die into the injector-accumulator cylinder thereby reducing the total flow rate of molten plastic to the extruding die. This will generally provide a smaller cross-sectional area of the wall of the tubing.

Similarly, during the inject stroke of the piston, molten plastic previously drawn into the cylinder is injected back into the molten plastic flow stream between the extruder and the die thereby increasing the total flow to the die, generally providing a larger cross-sectional area of the wall of the tubing.

It should be understood, however, that both the withdrawal phases and the inject phases of the injector-accumulator may be programmed in a manner to provide a wide variety of tubing or solid rod contours. Moreover, for tubing the inject and withdrawal phases of the injector-accumulator may be phased with the injection of air in the die and into the tubing lumen to vary the internal diameter and contour of the tubing as desired.

In programming the speed of movement of the piston a wide variety of contours of tubing may be produced. For example, by driving the injector-accumulator piston at a constant rate during the withdrawal phase, a narrow constant diameter tube will be produced. If the withdrawal phase is programmed to proceed with an accelerating rate of the piston, a straight narrowing tapered portion can be produced. Moreover, by varying the velocity of the piston in the injector-accumulator during the withdrawal phase various contours may be achieved.

Similar variations in contour may be provided during the inject phase of the injector-accumulator by suitable programming.

An important aspect of the present invention is that the injector-accumulator is constructed so that during the inject phase all of the molten plastic is injected from the associated cylinder to avoid any plastic accumulation in stagnant pockets. Plastic cannot thus deteriorate in the cylinder because of excessive exposure to the cylinder temperature.

BRIEF DESCRIPTION OF THE DRAWINGS

FIG. 1 is an extruding apparatus according to one preferred embodiment of the present invention;

FIG. 2 is an enlarged sub-assembly section of the injector-accumulator according to the present invention;

FIG. 3 is an extruding apparatus according to a second preferred embodiment of the present invention;

FIG. 4 is an extruding apparatus according to a third preferred embodiment of the present invention;

FIG. 5 is a longitudinal section of a portion of an exemplary tube produced by the present invention;

FIGS. 6 to 8 illustrate three exemplary programmed controls for the injector-accumulator actuator;

FIG. 9 are curves illustrating the displacement with respect to time of each of the actuators of FIGS. 6 to 8; and FIG. 10 are sectional views of the tubing produced by the programmed actuators of FIGS. 6 to 8.

DETAILED DESCRIPTION OF THE PREFERRED EMBODIMENTS

Referring to the drawings and more particularly FIG. 1, an extruder 10 is provided having a constant speed control 12 that is adapted to drive the extruder 10 continuously at a constant speed.

Molten plastic from extruder 10 is delivered to a single inlet extrusion die 14 through passage or conduit 16. Die 14 has inlet passage 18 with a central receiving passage 19 for supplying air through orifice 20 into the lumen of the extrudate designated at 24. Air is supplied to receiver passage 19 by an air supply control 25. The conduit 16 directs molten plastic from the extruder 10 to the die 14 and orifice 20.

Between the extruder 10 and the die 14 in passage 16 is an injector-accumulator 28 for the purpose of varying the flow rate in passage 16 and hence the total flow rate to the die inlet 18.

As seen more clearly in FIG. 2, the injector-accumulator 28 includes a cylinder 30 having a central bore 32 therein which slidably receives a piston 34 driven by rod 36. The rod 36 projects from the cylinder 30 through an end cap 38 having a suitable bushing and seal assembly as designated at 42.

Cylinder 30 also has a transverse passage 41 which intersects bore 32. Passage 41 communicates with bores defining passage or conduit 16 in fittings 43 and 44.

It should be noted that the bore 32 extends all the way to the passage 41 and that it is of uniform diameter thereby permitting piston 34 to move downwardly to the position shown in FIG. 2 in the inject stroke thereby completely clearing the bore 32 of any molten plastic and preventing the accumulation and deterioration of plastic within the injector-accumulator 28.

While a piston-cylinder accumulator has been illustrated and described, it should be understood that other types of accumulators may be employed for the same purpose, e.g. a bellows type.

As will appear more clearly in FIG. 1 when considered with reference to FIGS. 6 to 8, the injector-accumulator 28 is driven by a programmed actuator 45, and a control 46 is provided that synchronizes the air control 25 with the reciprocation of piston 34 to achieve the desired external and internal contour of the extrudate 24.

In operation of the FIG. 1 embodiment of the present invention, the extruder 10 is driven at a constant speed by control 12 thereby providing constant volume flow of molten plastic through passage or conduit 16. The programmed actuator 45 withdraws the piston 34 at a constant rate (for example), thereby withdrawing molten plastic from passage 16 at a constant rate. While the flow in passage 16 to the die inlet 18 is thereby reduced, it continues at a constant rate so that the resulting tubing or extrudate 24 is a constant diameter narrow section such as shown a 50 in FIG. 5. The air synchronizing control 46 at this time may maintain a constant air pressure from air control 25 to achieve a uniform walled straight tube section. The synchronizing control has control over the air control 25 through line 47.

At the end of the withdrawal stroke, programmed actuator 45 drives piston 34 downwardly in an inject stroke thereby injecting molten plastic into conduit or passage 16. The molten plastic from the injector-accumulator joins with the constant flow of molten plastic from the extruder to increase the volume of plastic at the die outlet 20 which, at a constant speed of tube 24 take-off from the die, results in the production of an enlarged section or bubble 51 in the tube 24 as shown in FIG. 5. The programmed actuator 45 in the inject stroke programs the acceleration and deceleration of piston 34 in a manner to produce different bubble diameters and axially tapered sections 51. If necessary, air under pressure may be injected in synchronism with the actuator to produce a desired shape. At the termination of the inject phase, another withdrawal phase begins forming an additional reduced diameter section 50' shown in FIG. 5. From the above it can be seen that, in cooperation with the increase and/or decrease in the volume of molten plastic being extruded from the die 20, variations in the air pressure in the tube being extruded will result in tubes of various diameters and thicknesses along the length of the tube.

A second embodiment of the present apparatus is shown in FIG. 3 and this differs from the extruding apparatus shown in FIG. 1 basically in the positioning of a check valve in the passage or conduit between the extruder and the injector-accumulator. In a manner similar to the FIG. 1 embodiment, a single extruder 52 is provided with a constant speed control 55 for driving the extruder continuously at a constant speed and providing a constant output flow of molten plastic in conduit 53. Molten plastic from conduit or passage 53 passes across check valve 54, passage 56, and passage 59 to inlet 60 of a single inlet extrusion die 62. Die 62 has an air receiving passage 63 which receives air from an air supply control 64 for the purpose of injecting air into the lumen of the extrudate 67.

An injector-accumulator 70, of identical construction with accumulator 28, is provided communicating with conduit or passage 56. Injector-accumulator 70 includes a similar programmed actuator 72 having a synchronizing control 75 for programming the air pressure from air control 64 to the receiving passage 63 of the die 62.

The operation of the FIG. 3 embodiment is identical to that of FIG. 1 with the exception of valve 54. With the extruder 52 extruding molten plastic into the conduit 53 it flows past the one-way valve 54 into the die 62. The injector-accumulator 70 draws off a measured quantity of plastic from section 56 of the conduit 53 and when the programmed amount of plastic has been loaded into the injector-accumulator 70, the direction of the piston 71 is reversed and the accumulated plastic is forced back into the continuous stream of plastic from the extruder. The check valve 54 prevents the accumulated material from being forced back toward the extruder. The combination described in FIG. 3 can generally be interchangeably used with the apparatus of FIG. 1.

Still a third embodiment of the present apparatus is shown in FIG. 4 wherein an extruder 110 having a constant speed control 112 is adapted to drive the extruder 110 continuously at a constant speed.

Melted plastic material from extruder 110 is delivered to a composite die 114 through passage or conduit 116. Die 114 has two inlet passages or conduits 117 and 118 with a central receiving passage 119 for supplying air through orifice 120 into the lumen of the extrudate designated at 124. Air is supplied to receiver 119 by an air supply control 125.

Inlet conduit 117 in the die is also interconnected with conduit 127 which directs plastic material across check valves 130 and 131 to the second die inlet 118.

Between the check valves 130, 131 in conduit 127 is an injector-accumulator 128 of the same general design and construction as described with respect to injector-accumulators 28 and 70 hereinabove. The injector-accumulator 128 is driven by a programmed actuator 145, and a control 146 is provided that synchronizes the air control 125 with the reciprocation of piston 134 to achieve the desired external and internal contour of the extrudate 124.

In operation of the FIG. 4 embodiment of the present invention, the extruder 110 is driven at a constant speed through the control 112 thereby providing constant volume flow of molten plastic material through passage 116. A portion of this plastic passes through the inlet 117 and another portion passes through conduit 127. The programmed actuator 145 withdraws the piston 134 at a constant rate (for example) thereby withdrawing molten plastic from conduit 127 at a constant rate. While the flow in conduit 127 to the die inlet 118 is thereby reduced, it continues at a constant rate so that the resulting tubing or extrudate is a constant diameter narrow section as shown at 50 in FIG. 5. The air synchronizing control 146 at this time may maintain a constant air pressure from air control 125 to achieve a uniform walled straight tube section. The synchronizing control has control over the air control 125 through line 147.

During the withdrawal stroke check valve 131 serves to prevent the withdrawal stroke of piston 134 from withdrawing molten plastic from die inlet 118.

At the end of the withdrawal stroke, programmed actuator 145 drives piston 134 upwardly in an inject stroke, thereby injecting molten plastic into conduit 127. Check valve 130 at this time directs the entire injection flow to die inlet 118. The programmed actuator 145 in the inject stroke programs the acceleration and deceleration of piston 134 in a manner to produce bubble section 51 shown in FIG. 5. At the termination of the inject phase another withdrawal phase begins forming an additional reduced diameter section 50' shown in FIG. 5.

To illustrate an exemplary manner of programming movement of the piston 34 to achieve various tubing contours, actuators 45a, 45b and 45c are shown in FIGS. 6 to 8. Actuator 45a is seen to consist of a constant speed continuously rotating motor 78 that drives a cam 79. The contour of the cam controls the velocity and acceleration of piston 34 in injector-accumulator 28.

In the FIG. 6 actuator, cam 79 is contoured so that it provides a constant velocity inject phase 80 and a constant velocity withdraw phase 81 with both phases occurring at the same velocity as shown in the piston displacement curves of FIG. 9. As shown in FIG. 10, the constant velocity inject and withdrawal phases of the actuator will result in a large constant diameter section 83, a tapering transition section 84 and a smaller constant diameter section 85. The transition zone 84 occurs during the change from the inject to the withdrawal phases and can be made to fall off sharply or to taper off gradually by appropriate cam design coordinated with knowledge of the characteristics of the die, the injector-accumulator 28 and the extrudate material.

By substituting different cam configurations, the piston 34 may be programmed in any manner desired. For example, as shown in FIG. 7, a cam 88 is contoured to provide a constant velocity movement of the piston 34 as shown by curve 89 in FIG. 9. Since cam 88 is constructed to provide a more rapid rise than cam 79, a shorter injection phase is achieved and results in an enlarged diameter section 91 in the extrudate with the section 91 being of shorter length (as compared to section 83) since the injection phase is of shorter duration. Cam 88 provides a slow constant speed withdrawal phase of piston 34 as shown by curve 92 in FIG. 9 which produces a constant narrow diameter tube section 95. A tapered transition zone 93 is provided between sections 91 and 95 which zone can be varied as described above.

The programming cam 97 shown in the actuator 45c in FIG. 7 provides a decelerating inject stroke of piston 34 as shown by displacement curve portion 100 and an accelerating withdrawal stroke as shown by curve portion 102. A properly programmed decelerating inject stroke provides a narrowing substantially straight tapered portion 105 in the tube while an accelerating withdrawal stroke provides a narrowing substantially straight tapered portion as shown at 106 in the tube.

It will be apparent from the above that the duration of the withdrawal and the inject phases may be varied as desired to control the length of various sections. Moreover, the rate of acceleration and deceleration of both the withdrawal and the inject strokes of the piston, as well as piston dwell, may be varied as desired to produce virtually any contour tubing or rod desired. It should be understood that the tubing sections shown in FIG. 10 are merely exemplary of one cycle of each of the cams so that these cycles repeat themselves continuously during operation of the extruding device. Moreover, it should be understood that the cams shown in FIGS. 6 to 8 are merely exemplary programming actuators and that other controls and programming control circuits may be provided for controlling movement of the piston 34 in the desired manner. For example, solid state electronic, pneumatic or hydraulic controls may be provided for controlling movement of the piston to produce a desired configuration. In addition, while the invention has been described with respect to the extrusion of a plastic material, it should be understood that it is equally applicable to any extrudable material.

We claim:

1. An extruding apparatus, comprising: extruding means for continuously producing an extrudable material, annular die means for continuously producing a tubular extrudate, means interconnecting said extruding means and die means for establishing a flow path for continuous delivery of said extrudable material from said extruding means to said die, a cylinder in fluid flow communication with both the extruding means and die means, said cylinder having a movable piston device therein for withdrawing a portion of the extrudable material while the extruding means is delivering extrudable material to the die means to reduce the rate of flow of extrudable material received by the die means and for injecting said portion of said extrudable material while the extruding means is delivering extrudable material to the die means to increase the rate of flow of extrudable material received by the die, to thereby vary the rate of flow of the extrudate, and means for moving said piston device in withdrawal and inject strokes for maintaining said flow path substantially unobstructed by said piston device during withdrawal and injection of said extrudable material.

2. An extruding apparatus as defined in claim 1, wherein said die means includes means for receiving air under pressure to form a tube, means for supplying air to said die receiving means, said air supply means being synchronized with the movement of the piston device to provide the desired contour of the extrudate tubing.

3. An extruding apparatus as defined in claim 1, wherein said means for moving said piston device in withdrawal and inject molten extrudable material relative to said controlling the rates of withdrawal and injection to produce a predetermined rate of flow of extrudate.

4. An extruding apparatus as defined in claim 1, wherein said interconnecting means comprises a conduit interconnecting said extruding means and said die, said cylinder and piston device being connected to withdraw and and inject molten extrudable material relative to said conduit, first check valve means blocking injection flow back to the extruding means from the cylinder and piston device, and second check valve means for blocking flow from the die toward the cylinder and piston device in the withdrawal stroke thereof.

5. An extruding apparatus as defined in claim 1, wherein said interconnecting means comprises conduit means interconnecting said extruding means and said die, and check valve means blocking injection flow back to the extruding means from the cylinder and piston device.

6. An extruding apparatus comprising: an extruder, means for continuously driving said extruder for continuously producing extrudable material at the output of said extruder, an annular extruding die for producing a continuous tubular extrudate, conduit means interconnecting said extruder and die for delivery of said extrudable material to said die, an accumulator in fluid flow communication with said conduit means for cyclically varying the rate of flow of extrudable material supplied to said die, said accumulator comprising a cylinder and a reciprocal piston, said cylinder receiving a portion of said extrudable material from said conduit means during a withdrawal stroke of said piston and delivering said portion of extrudable material to said conduit means during an inject stroke of said piston, to thereby vary the rate of flow of extrudable material received by said die and the rate of flow of extrudate, and means for driving said piston in withdrawal and inject strokes for maintaining said conduit means substantially unobstructed by said piston during withdrawal and injection of said extrudable material.

References Cited

UNITED STATES PATENTS

| 3,089,192 | 5/1963 | Adams | 18—30 AC X |
| 3,090,994 | 5/1963 | Stenger | 18—30 AS UX |
| 3,217,360 | 11/1965 | Mason et al. | 18—5 BV X |
| 3,479,422 | 11/1969 | Zavasnik | 18—14 V X |
| 3,579,733 | 5/1971 | West | 18—14 V |
| 3,001,234 | 9/1961 | Renier | 18—30 AC |
| 3,266,093 | 8/1966 | Corbett | 18—14 G |
| 3,526,929 | 9/1970 | Coupland | 18—14 R |
| 3,280,847 | 10/1966 | Chisholm et al. | 264—167 UX |

FOREIGN PATENTS

| 1,017,398 | 1/1966 | Great Britain | 18—14 S |

J. SPENCER OVERHOLSER, Primary Examiner

M. O. SUTTON, Assistant Examiner

U.S. Cl. X.R.

264—176 R; 425—376, 381, 145

PO-1050
(5/69)

UNITED STATES PATENT OFFICE
CERTIFICATE OF CORRECTION

Patent No.  3,674,404                   Dated   July 4, 1972

Inventor(s)   Norbert W. Burlis and Daniel A. Talonn

It is certified that error appears in the above-identified patent and that said Letters Patent are hereby corrected as shown below:

Column 6, line 44, delete "molten extrudable material relative to said" and insert therefor --strokes comprises means for predeterminedly--; line 51, delete "and".

Signed and sealed this 17th day of October 1972.

(SEAL)
Attest:

EDWARD M.FLETCHER,JR.
Attesting Officer

ROBERT GOTTSCHALK
Commissioner of Patents